Figure 1:
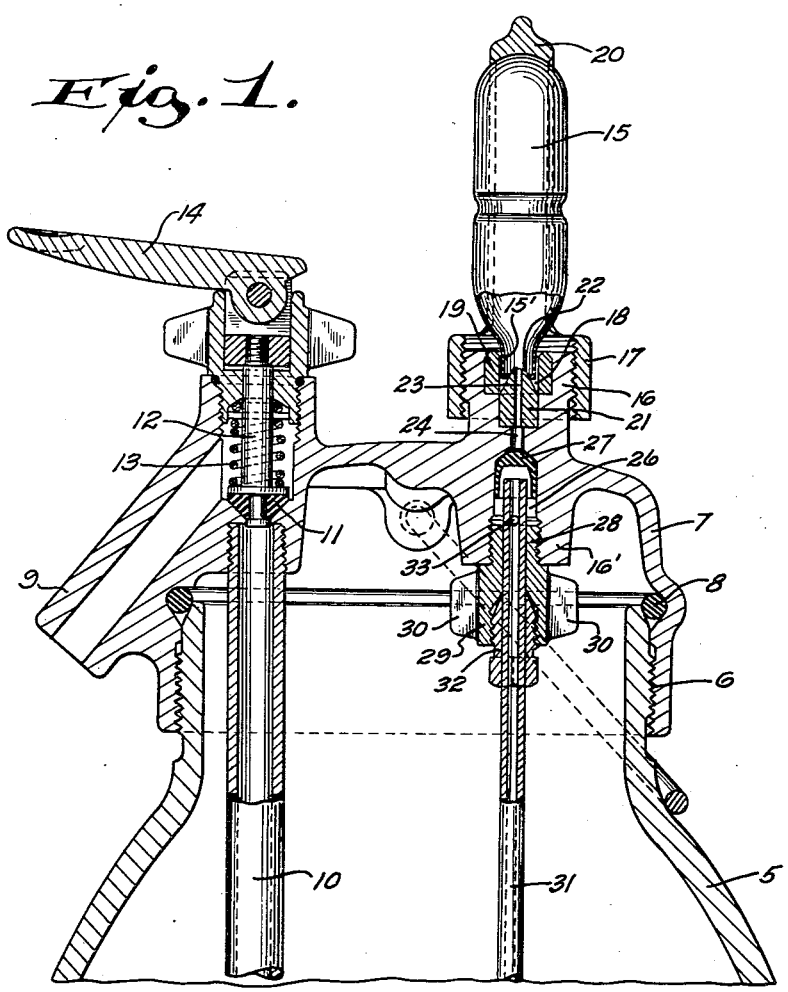

June 4, 1957    R. F. QUAM    2,794,452
VALVES FOR PRESSURE JUGS OR THE LIKE
Filed Jan. 31, 1955

INVENTOR.
Ranold F. Quam,
BY Morsell & Morsell
ATTORNEYS.

United States Patent Office 2,794,452
Patented June 4, 1957

2,794,452

VALVES FOR PRESSURE JUGS OR THE LIKE

Ranold F. Quam, Fort Atkinson, Wis.

Application January 31, 1955, Serial No. 484,878

7 Claims. (Cl. 141—17)

This invention relates to improvements in valves for pressure jugs or the like, and more particularly to a pressure jug valve which will puncture a $CO_2$ cartridge and permit the flow of gas through the valve for charging the contents of the jug, but preventing the outward or return flow of gas.

A general object of the invention is to provide a simple and effective form of pressure jug valve for association with a $CO_2$ cartridge piercing pin which is efficient in its operation, and may be readily removed from the jug for disassembly and cleaning.

In many pressure jug valves now available, considerable initial pressure is required by the gas from the punctured cartridge to open the inlet orifices and hold the same open while the contents of the jug is being charged, with the result that after the jug is partially charged and the contents of the charging cartridge have been partly exhausted there may be insufficient pressure from the gas discharging from the cartridge to retain the inlet orifice in open condition with the result that the remaining contents of the charging cartridge may be wasted. Also, the initial discharge of $CO_2$ gas from the cartridge may result in the formation of Dry Ice in the minute inlet orifice which will be troublesome.

A specific object of the present invention is to overcome these objections inherent in certain of the prior pressure jug valves by a construction which permits the utilization of all of the $CO_2$ gas from the cartridge and its easy flow through the inlet orifice without obstruction or hindrance.

A further, more specific object of the invention is to provide a pressure jug valve wherein the pressure from the gas flowing into the jug reacts against outer surface portions of a cup-shaped rubber valve within the inlet conduit to open the conduit but when the contents of the $CO_2$ charging cartridge has been exhausted, the pressure of the gas within the jug and charging conduit will react against internal portions of the cup-shaped rubber valve to hold it tightly within its seat and prevent return or outward flow of the gas within the jug.

A further object of the invention is to provide a pressure jug check valve which includes a cartridge piercing pin and which may be easily assembled and disassembled for cleaning, repairs and replacements.

A further object of the invention is to provide a valve for pressure jugs or the like which permits utilization of all of the contents of the charging cartridge, which is easy to operate and service, which is relatively inexpensive, and which is well adapted for the purposes described.

With the above and other objects in view, the invention consists of the improved valve for pressure jugs or the like, and its parts and combinations as set forth in the claims, and all equivalents thereof.

Figure 2:
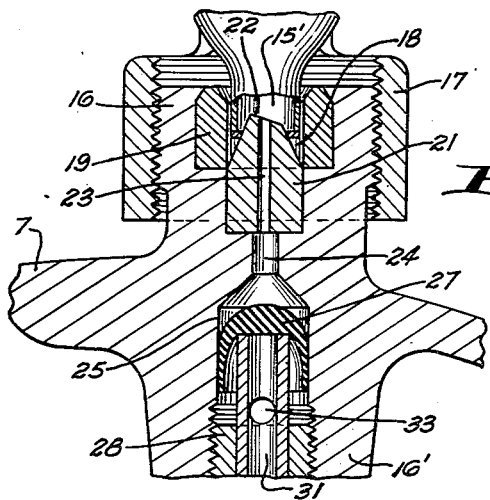

In the accompanying drawing in which the same reference characters indicate the same parts in all of the views:

Fig. 1 is a vertical sectional view through the upper portion of a pressure jug or container equipped with a $CO_2$ charging cartridge and the improved check valve assemblage shown in closed position; and Fig. 2 is an enlarged fragmentary detail sectional view of the cap portion of the jug and the valve mechanism shown in open position for the flow of the contents of the cartridge into the jug.

Referring more particularly to the drawing, the numeral 5 indicates a pressure jug or container having a threaded open neck portion 6 which is closed by a cap 7 removably threaded thereonto, with an annular resilient gasket 8 being confined between the upper external peripheral portion of the jug neck and adjacent inner surface portions of the cap 7.

As is conventional, the jug or container 5 is adapted to contain a liquid which is to be aerated or charged and the charged contents of the jug 5 may be selectively discharged from the cap portion of the container jug through a downwardly directed spout 9 communicating with a discharge tube 10 which extends from a chamber portion of the cap downwardly into the lower portion of the jug or container. Fluid flow through the tube 10 and out of the spout 9 is controlled by a valve 11 carried by a valve stem 12 which may be upwardly reciprocated to open the valve 11 against the tension of a coiled spring 13 when the operating handle 14 is pivotally operated. This dispensing valve construction is conventional and forms no part of the present invention, the present invention being concerned with the cartridge piercing check valve assemblage which is carried by the cap 7 to introduce gas under pressure from a charging cartridge 15 into the contents of the jug or container 5.

As will be observed from the drawing the cap 7 is formed with an upwardly projecting externally threaded bored boss 16 on which is removably threaded a collar 17 which vertically supports the charging cartridge 15, the latter having its originally sealed pierceable reduced neck portion 15' extending into the collar and into the upper end of a bore 18 in the boss 16, said portion of the bore 18 containing a rubber gasket 19. The cartridge is removably and replaceably retained in its mounted position by a conventional clamp 20.

Seated in the lower portion of the bore 18 is a cartridge punch 21 formed of hardened steel and having a conical upper end portion extending into the gasket 19 with the upper extremity of the conical portion being truncated as at 22 to provide a puncturing edge. Obviously, when the collar 17 carrying the cartridge 15 is turned downwardly sufficiently far on the boss 16 the sealed inner end portion of the cartridge 15 will ultimately be forcefully contacted with the puncturing truncated end 22 of the punch 21 to provide an opening in the end of the cartridge through which the compressed fluid or $CO_2$ may discharge through an axial bore 23 in the punch 21. The lower end portion of the axial bore 23 registers with a bore 24 in the boss 16 which opens into the dome-shaped upper end portion 25 of a circular cavity 26 extending through the protruding portion 16' of the cap 7, the portions 16 and 16' being in alinement.

A cup-shaped check valve 27 is movably mounted in the upper end portion of the passage 25 so as to normally seat in the dome-shaped upper end of said passage, the head portion of said check valve 27 being shaped to conform to and fill the dome-shaped upper end of the passage 25. Said check valve 27 is preferably formed of molded rubber having a high degree of yieldability or resiliency. The lower end portion of the passage 25 is internally threaded and removably receives the threaded nipple portion 28 of a bored valve retainer 29. The enlarged lower end portion of the retainer 29 is formed with laterally projecting wings 30 to facilitate manual threading of the nipple portion 28 into and out of the lower end portion of the cavity 26.

The jug charging tube is indicated by the numeral 31 and its upper end portion extends through the axial bore in the valve retainer 29 and projects above the nipple portion 28 into the cavity 26 and into the cup-shaped rubber check valve 27. A portion of the charging tube 31 is also tightly engaged by a clamping member 32 which extends into an enlargement of the axial bore in the valve retainer 29 and is threaded into the stock thereadjacent. An upper end portion of the charger tube 31 above the upper extremity of the nippel 28 is formed with a transverse port 33.

The improved check valve mechanism is adapted to be removably assembled to the cap 7 of the jug or container in the manner shown in Fig. 1. The jug is filled with water or other fluid which is to be aerated or charged and the cap 7 is securely threaded onto the neck portion of the jug. The collar 17, carrying a loaded charging cartridge 15, is then screwed down onto the cap boss 16 until the inner end portion of the cartridge is punctured by the member 21 whereupon gas under pressure is free to discharge from the punctured lower end portion of the cartridge. This discharging gas under pressure flows through the axial bore 23 in the puncturing member 21 and downwardly through the bore 24, reacting with force against the external surface of the rubber cup-shaped check valve 27 to ultimately displace the cup-shaped valve 27 to the position of Fig. 2. The yieldability of the cup-shaped valve 27 permits the gas to flow between the outer surface of the valve 27 and the stock surrounding the passage 25, and from thence into the charging tube 31 through the transverse port 33. The gas then is forced downwardly through the charging tube 31 to discharge from the lower end thereof into the liquid contents of the jug 5 to aerate or charge the same.

During the charging of the contents of the jug 5 the pressure of the gas or fluid discharging from the punctured lower end of the cartridge 15 is greater than the back pressure of the gas or charged fluid in the jug with the result that the check valve 27 will remain in the position of Fig. 2 until all of the gas from the cartridge 15 has been exhausted into the jug through the charging tube 31. When the cartridge has exhausted its contents the pressure of the fluid or gas within the charging tube 31 will react against inner surface portions of the cup-shaped check valve 27 to raise it into the dome-shaped end of the cavity 26 and thus shut off the lower end of the bore 24, effectively preventing any back or return flow of the gas or fluid.

It will be appreciated that due to the resiliency of the cup-shaped rubber check valve 27, during the downflow of gas from the cartridge to charge the contents of the jug, the gas pressure reacting against narrowed external portions of the rubber check valve will deform said portions or force said portions inwardly sufficiently to create a crevice through which the gas may flow to pass into the transverse port 33 of the charging tube 31. However, when the contents of the charging cartridge have been exhausted and there is no further down pressure, the pressure of fluid or gas within the charging tube 31 reacts against the inner surface portions of the rubber check valve 27 to force the same tightly into the dome-shaped upper end of the cavity 26 to seal off the lower end of the bore 24.

Due to the fact that the axial bore in the cartridge piercer 21 is of a substantial size and is formed in a metal member, this discharge bore or orifice will not get clogged and can be freed of possible Dry Ice formations by the down-surging gas.

All of the elements of the valve are carried by the removable cap 7 for the jug or container and by removing the cap all portions of the valve assemblage may be separated and cleaned, repaired, or replaced.

When the liquid contents of the jug 5 have been aerated or charged through the gaseous medium introduced thereinto from the cartridge 15, the aerated or charged contents of the jug may be forcefully discharged from the jug through the spout 9 by manipulation of the valve operating handle 14.

Very effective use of the charging contents of the cartridge 15 can be made because the inlet orifices 23, 24 and 26 are open when the gas is discharging from the cartridge and cannot become clogged or obstructed whereby the entire contents of the cartridge 15 is introduced into the liquid in the jug 5 for charging purposes. After the entire contents of the cartridge 15 have been introduced into the jug, the back pressure through the charging tube 31 will automatically return the check valve 27 to its closing position to prevent undesired escape of any of the gaseous contents of the jug.

The improved valve for pressure jugs or the like is simple, efficient, easy to disassemble and service, and is well adapted for the purposes described.

What is claimed as the invention is:

1. Charging valve mechanism for controlling the discharge of fluid from containers of the puncturable type, comprising a container cap formed with a passage therethrough, means for seating a fluid container on the cap in registration with the passage, a puncturing member mounted within the cap to puncture the seated end portion of the fluid container and having a fluid port therein opening into the cap passage, a cup-shaped yieldable valve normally closing said passage and reciprocatable between open and closed positions, a fitting extending into the cap opposite the fluid container seat, and a charging tube carried by said fitting and extending into the cup-shaped valve, said tube having a transverse opening therein below the valve through which fluid passes when the valve is in open position.

2. Charging valve mechanism for controlling the discharge of fluid under pressure from containers of the puncturable type, comprising a container cap formed with a passage therethrough, a portion of said passage being enlarged and forming a valve seat, means for mounting a fluid container on the cap in registration with one end portion of the passage, a puncturing member mounted within the cap to puncture an end portion of the fluid container and having a fluid port therein opening into the valve seat portion of the passage, a cup-shaped yieldable valve reciprocatably mounted in said passage and engaging said valve seat to close the passage when a predetermined fluid pressure reacts against internal portions of the cap-shaped valve, a fitting extending into the cap, and a fluid discharge tube carried by said fitting and extending into the cup-shaped valve, said tube having a transverse opening therein below the valve through which fluid passes from externally of the valve when the latter is in open position away from its seat.

3. Charging valve mechanism for controlling the discharge of fluid under pressure from containers of the puncturable type, comprising a container cap formed with a passage therethrough, a portion of said passage being enlarged and forming a valve seat, means for replaceably mounting a fluid container on the cap in registration with one end of the passage, a stationary puncturing member removably mounted within the cap to puncture the seated end portion of the fluid container and having a fluid port therein opening into the valve seat portion of the cap passage, a cup-shaped valve having its annular wall yieldable and normally closing said passage and reciprocatable into and out of valve seat engaging positions, a fitting removably extending into the cap in a position opposite the fluid container, and a fluid discharge tube removably carried by said fitting and extending into the cup-shaped valve, said tube having a transverse opening therein below the valve through which fluid passes when the valve is removed from its seat, contact of the closed end of the valve with the end of the tube limiting movement of the valve away from the seat in response to fluid pressure from the container reacting against external portions of the valve.

4. Charging valve mechanism for controlling the discharge of fluid under pressure from containers of the puncturable type, comprising a container cap formed with a passage therethrough, a portion of said passage being enlarged and forming a valve seat, means for replaceably mounting a fluid container on the cap in registration with one end of the passage, a stationary puncturing member removably mounted within the cap to puncture the seated end portion of the fluid container and having a fluid port therein opening into the valve seat portion of the cap passage, a cup-shaped valve having its annular wall yieldable and normally closing said passage and reciprocatable into and out of valve seat engaging positions, a fitting removably extending into the cap in a position opposite the fluid container, and a fluid discharge tube removably carried by said fitting and extending into the cup-shaped valve, said tube having a transverse opening therein below the valve through which fluid passes when the valve is removed from its seat, contact of the closed end of the valve with the end of the tube limiting movement of the valve away from the seat in response to fluid pressure from the container reacting against external portions of the valve, the valve being moved into its seat to close the passage when fluid pressure from the end of the tube reacting against internal portions of the valve exceeds fluid pressure from the container reacting against external portions of the valve.

5. Charging valve mechanism for controlling the discharge of compressed fluid from containers of the puncturable type, comprising a container cap for removable mounting on a container, the contents of which are to be charged, said cap being formed with a passage therethrough opening on opposite sides of the cap, means for seating a compressed fluid container on the cap in registration with one end portion of the passage, a puncturing member mounted within the cap to puncture the seated end portion of the fluid container and having a fluid port therein opening into the cap passage, the cap passage adjacent the port being enlarged to form a valve seat, a hollow cup-shaped yieldable valve within said passage and reciprocatable to and from said valve seat, a fitting extending into the cap opposite the compressed fluid container seat, and a charging tube depending from said fitting and extending into the cup-shaped valve, said tube having a transverse opening therein below the valve through which fluid passes when the valve is removed from its seat.

6. Charging valve mechanism for controlling the discharge of compressed fluid from containers of the puncturable type, comprising a container cap for removable mounting on a container, the contents of which are to be charged, said cap being formed with an outwardly projecting boss, there being a passage through the boss and cap opening on opposite sides of the cap, a compressed fluid container holder removably and adjustably engaging the cap in registration with one end portion of the passage, a puncturing member mounted within the cap to puncture the end of a fluid container mounted in the holder upon adjustment of the holder, said puncturing member having a fluid port therein opening into the cap passage, the cap passage adjacent the port being enlarged to form a valve seat, a hollow cup-shaped yieldable valve within said passage and reciprocatable to and from said valve seat, a fitting extending into the cap opposite the compressed fluid container seat, and a charging tube engaged by said fitting and extending into the cup-shaped valve, said tube, adjacent the valve, having a transverse opening therein through which fluid passes when the valve is removed from its seat to permit fluid flow from a container through the cap passage and into the charging tube when fluid pressure from the passage exceeds fluid pressure from the end of the tube adjacent the valve.

7. A valve mechanism assemblage comprising a cap formed with a passage therethrough, a portion of said passage being enlarged and forming a valve seat, means for connecting a fluid supply member to the cap in registration with one end portion of the passage, a hollow cup-shaped yieldable check valve reciprocatably mounted in said passage and engaging said valve seat to close the passage when a predetermined fluid pressure reacts against internal portions of the cup-shaped valve, a fitting extending into the cap, and a fluid discharge tube carried by said fitting and extending into the cup-shaped valve, said tube having a transverse opening therein below the valve through which fluid passes from externally of the valve when the latter is in open position away from its seat, the fluid supply member connector, the valve, the fitting and the tube all being removable from the cap for cleaning and replacements.

References Cited in the file of this patent

UNITED STATES PATENTS 2,189,643     Ward  ---------------- Feb. 6, 1940

FOREIGN PATENTS 354,225     France  ---------------- July 21, 1905